US005626936A

United States Patent [19]
Alderman

[11] Patent Number: 5,626,936
[45] Date of Patent: May 6, 1997

[54] PHASE CHANGE INSULATION SYSTEM

[75] Inventor: Robert J. Alderman, Ruskin, Fla.

[73] Assignee: Energy Pillow, Inc., Seguin, Tex.

[21] Appl. No.: 118,567

[22] Filed: Sep. 9, 1993

[51] Int. Cl.$^6$ .................................................. B32B 3/06
[52] U.S. Cl. ........................... 428/68; 126/618; 165/46; 428/71; 428/72; 428/76; 428/192; 428/320.2; 428/323; 428/330; 428/913
[58] Field of Search ........................ 428/68, 71, 72, 428/76, 192, 320.2, 323, 330, 913; 126/618; 165/46

[56] References Cited

U.S. PATENT DOCUMENTS

| 907,099 | 12/1908 | Trowbridge | 220/428 |
|---|---|---|---|
| 2,835,483 | 5/1958 | Lindsay | 263/41 |
| 2,876,634 | 3/1959 | Zimmerman et al. | 62/457 |
| 2,893,704 | 7/1959 | Passman | 257/250 |
| 2,926,508 | 3/1960 | Moon | 62/457 |
| 3,148,676 | 9/1964 | Truog et al. | 126/247 |
| 3,463,140 | 8/1969 | Rollor, Jr. | 126/246 |
| 3,603,106 | 9/1971 | Ryan | 62/457 |
| 4,253,983 | 3/1981 | Blanie | 253/70 |
| 4,259,401 | 3/1981 | Chahroudi | 428/306 |
| 4,290,247 | 9/1981 | Alderman . | |
| 4,299,715 | 11/1981 | Whitfield et al. | 252/74 |
| 4,482,010 | 11/1984 | Cordon | 165/53 |
| 4,587,279 | 5/1986 | Salyer | 52/309.17 |
| 4,856,294 | 8/1989 | Scaringe | 62/259.3 |
| 4,931,333 | 6/1990 | Henry | 428/76 |
| 5,233,840 | 8/1993 | Scaringe | 62/77 |
| 5,290,904 | 3/1994 | Colvin | 428/68 |

OTHER PUBLICATIONS

"Thermal Performance of a Heat Storage Module Using PCM's with Different Melting Temperatures: Mathematical Modeling" by Mohammed M. Farid and Atsushi Kanzawa, *Journal of Solar Energy Engineering*, May 1989, vol.111, pp. 152–157.

Arctander, *Popular Science*.

"Phase Change Materials as Energy Storage Media" by John O'C. Young, *Sunworld*,vol.6,No.6, 1982, pp. 169–171.

"What's in Store for Phase Change?" by David Eissenberg and Charles Wyman, *Solar Age*, May 1980.

"Solar-Heat Storage System" by David Scott Mar. 1982.

"New Heat Storage Material", *Sun*, Mar. 1980.

"Solar Salts" by Richard Stepler, *Popular Science*, Mar. 1980.

"Clever Places to Hide Heat-Storing Salts" by Erik H. Arctander, *Popular Science*.

*Primary Examiner*—Nasser Ahmad
*Attorney, Agent, or Firm*—Thomas, Kayden, Horstemeyer & Risley

[57] ABSTRACT

An insulation system (10) is placed in ceilings or walls of buildings which are typically exposed on one side thereof to relatively large temperature changes and on the other side to relatively small temperature changes. The insulation system (10) includes a first thicker layer of insulative material (18) and a second thinner layer of insulative material (19), with an intermediate layer of phase change material (20) sandwiched therebetween. The phase change material undergoes a change of phase between solid state and liquid state during the course of a typical day due to the outside temperature ranging higher and lower than the phase change temperature. When undergoing a change of phase, the phase change material maintains a constant phase change temperature and therefore avoids exposure of the interior space (22) from the much higher or much lower temperatures of the exterior surface (21), thereby reducing the power requirements to maintain the desired temperature within the interior space (22).

26 Claims, 7 Drawing Sheets

PHASE CHANGE INSULATION SYSTEM

FIELD OF THE INVENTION

The present invention relates generally to a thermal insulation system for placement between a relatively constant temperature space and a variable temperature space which in a typical time period reaches temperatures higher than and lower than a predetermined temperature. The insulation system is suitable for placement in the ceiling or walls of buildings, particularly in an overhead ceiling adjacent an attic exposed to the atmosphere outside the building or a vertical external wall, both of which are exposed on one side to relatively large temperature changes and on the other side to relatively small temperature changes.

BACKGROUND OF THE INVENTION

Building structures constructed for human occupancy typically maintain the temperature and humidity conditions inside the building at a comfortable level for its occupants with the use of heating and air conditioning equipment controlled by a thermostat, whereas the temperature outside the building varies with atmospheric conditions. In a twenty-four hour day during most days of a year in most inhabited locations of the world, the temperature of a roof or an external wall that faces the sun typically ranges to levels below and above the desired indoor temperature which is in the mid seventies, Fahrenheit.

The roof or exterior wall structure of a typical modern building includes at least one layer of thermal insulation material which retards the transfer of heat between the inside and outside surfaces. If the insulation material present in the typical insulated wall or ceiling is sufficient, the transfer of heat during the high temperature portion of the day from the hot outside portion of the wall or ceiling to the lower constant inside temperate portion of the ceiling will be slow enough so that the temperature of the inside wall or ceiling may have no measurable increase in temperature. Later during the same day the exterior portion of the wall and ceiling will cool during the low temperature portions of the day, usually to a temperature that is lower than the inside temperature of the dwelling.

The rate at which heat will flow through a wall or ceiling into or out of a room maintained at a substantially constant temperature is dependent upon at least two factors: the difference between the temperature inside the room, across the ceiling and wall to the temperature outside the room, and the efficiency with which the ceiling or wall structure conducts heat between the inside temperate surfaces of the building and the hotter or cooler outside surfaces of the building. In order to reduce the rate of heat transfer across the ceiling or wall into or out of the building structure, a greater quantity of and a more efficient insulating material can be utilized. Such insulating materials can include, for example, fiberglass, mineral wool, urethane foams, cellulose and other materials well known in the art.

However, the cost of producing and installing the most efficient and most suitable insulating materials for a well-insulated ceiling or wall structure is rather high. Typically, the structure above the ceiling of a house includes a roof structure having several layers, such as an exterior layer of shingles and felt, several intermediate layers of wood boards, parallel joists, and wall board panels attached thereto and extending horizontally for forming a ceiling, and layers of insulation dispersed about the joists and panels. Similarly, the exterior wall structure of a building includes several layers such as an exterior layer of brick, wood or other siding, an inner layer of wall board, and an intermediate layer of insulation. Although providing the conventional insulating materials in an attic space or in the exterior walls of a building structure can be effective at reducing heat transfer through the walls or ceilings, etc., the insulation materials are expensive, are bulky to handle, difficult to install, and in some instances are not very effective. Also, some structures are not built with enough space to accommodate enough insulation to adequately insulate the structure.

It has been known in the past to use phase change materials to store heat by causing a change in the "state" or "phase" of the materials from a solid to a liquid. Generally, the heat applied to a phase change material is "consumed" by the material during its conversion from solid state to liquid state, while the phase change material maintains a substantially constant temperature. In reverse, the heat which was absorbed by the change to the liquid phase is released when the phase change material gives up its latent heat of liquification and turns into its solid state. Some examples of phase change materials for isothermally storing and releasing heat are paraffin, calcium chloride hexahydrate, sodium sulfate, and Glauber's salt.

An example of using phase change material as an insulator is found in U.S. Pat. No. 2,876,634 to Zimmerman et al. which shows a thermodynamic tea cup having an intermediate layer of phase change materials. The tea cup provides a means for effecting a rapid cooling of heated liquids to a satisfactory temperature for maintaining the contents of the cup at that temperature. Another U.S. Pat. No. 3,463,140 to Rollor, Jr. discloses a double walled container, defining an annulus. Paraffin is inserted in the annulus so that when a hot liquid is poured into the container, some of the heat from the liquid is transmitted to and stored in the paraffin as the paraffin fuses at a temperature which is approximately the optimum temperature for drinking hot liquids. Furthermore, U.S. Pat. No. 4,603,106 to Ryan illustrates another thermodynamic food and beverage container. The Ryan container includes a heat storage material disposed therein for regulating the temperature of the food and beverage within the container. Therefore, the prior art known to the inventor shows relatively small containers for containing and maintaining the temperature of a small quantity of material.

One of the main problems with using phase changing materials in a practical application for isothermally storing and releasing heat in a large structure such as a building is containing the quantity of phase change materials properly dispersed over a large area. Another problem with using phase changing materials in a practical application is containing the phase change material when in its liquid phase in an optimum position whereby it will perform its phase changing between its liquid and solid states continually and in an evenly distributed manner. Particularly, when the material liquifies, the liquid has an ability to move under the influence of gravity or to become absorbed into an adjacent material. If dislocated while in its liquid phase, the phase change material might be dislocated from its optimum position for its next phase change occasion. Also, if the phase change material is not retained in one position but is allowed to leak or move to other areas, the concentration of the phase change material in the water admixture is likely to change and is likely to cause a change in the performance of the phase change material.

Therefore, while the latent heat absorption and release capabilities of certain phase change materials have been known and used in limited ways in the past, no known practical and commercial use has been made of phase change materials in conjunction with insulation materials for insulating living spaces from one another, such as the ceiling area or exterior walls of a building structure from the atmosphere. It is to the provision of such a phase change insulation system that the present invention is primarily directed.

BRIEF DESCRIPTION OF THE INVENTION

Briefly described, the present invention comprises a thermal insulation system for placement between a relatively constant temperature space and a variable temperature space which in some uses of the invention reaches temperatures higher than and lower than the temperature of the constant temperature space. More particularly, the thermal insulation system is especially suitable for placement in a ceiling or wall structure of a building or dwelling, and the system includes phase change material ("PCM") usually sandwiched as an intermediate layer between two other layers of insulative material. The PCM functions as a means for latent heat absorption and release in a ceiling or wall structure, which functions as a heat transfer barrier between a hotter side and a cooler side of the building. The phase change temperature stays approximately constant and this temporarily reduces the transfer of heat across the building structure, and therefore increases the efficiency of the overall insulation during the change of phase of the PCM.

More particularly, the invention comprises insulation for an attic space, for example, for placement between joists adjacent the surface of the ceiling panels and for placement in an interior portion of an external wall structure of a building. Typically, a relatively constant temperature is maintained on the interior surfaces of the building by heating and air conditioning systems, and the temperatures of the outside surfaces in a twenty-four hour period typically are lower in the night hours and higher in the day hours than the temperature of the inside surfaces. In a preferred embodiment, the insulation system of the present invention includes a first thicker layer of insulative material, a second thinner layer of insulative material mounted parallel to and in overlying relationship with respect to the first layer, and an intermediate layer of PCM sandwiched between the facing surfaces of the first thicker and the second thinner layers of insulative material. The first thicker layer of insulation material usually is placed adjacent the constant temperature space such as the sheetrock or other interior panel of a ceiling or internal panel of a wall of a building, and the second thinner layer of insulative material is placed facing the variable temperature space, such as the exterior of the building. In addition, the intermediate layer of PCM comprises one or more PCMs that change between a solid state and a liquid state at a predetermined phase changing temperature preferably at a temperature close to the temperature of the constant temperature space.

The PCM is selected from materials with characteristics that will change phase between the anticipated highest and lowest temperatures of the variable temperature space during a particular time lapse. For example, in an attic or in an exterior wall structure of a building in the course of a 24 hour day, the PCM will change from a solid state to a liquid state and back to a solid state as the outside temperature increases from below to above and back to below the phase changing temperature. Therefore, the PCM positioned between the other layers of insulation completes a cycle within the course of a typical 24 hour day.

As the PCM within the layers of insulation changes state, it maintains its substantially constant phase changing temperature although it absorbs heat from or gives up heat to the outside surface of a ceiling or the outside surface of a wall structure. Therefore, while during the hot part of a day the heat from a space outside of the wall or ceiling structure transfers through the outer layer of insulation and continues to be transmitted to the PCM during hot hours of the day, the layer of PCM will shield the inside layer of insulation and the panels of the ceiling or the wall structure by the constant temperature conversion of sensible heat to latent heat for as long as the PCM continues to change from a solid state to a liquid state. The shield effect is achieved because the PCM maintains a constant temperature during its change of phase.

Finally, when the PCM completely changes to a liquid state, the PCM will begin to increase in temperature and the heat will begin to be transferred across the PCM and the inner thicker layer of insulated material to the inner surface of the building adjacent the controlled temperature space. Until this begins to happen, the PCM reduces the transfer of heat that would otherwise occur through a similar ceiling or wall structure that does not include the PCM, thereby reducing the load required on the air conditioning system for the building.

During the cooler temperature portions of the day, when the outside temperature falls to a level below the desired temperature of the temperature controlled space and below the phase changing temperature, the opposite phenomenon occurs and the PCM begins to change from a liquid state to a solid state. While the heat is released from the PCM through the outer layer of insulation material and to the cooler outside environment, the PCM continues to remain at a constant temperature as it changes phase to a solid, even though the outside temperature may have fallen well below the desired inside temperature for the building. Thus, the PCM shields the inner layer of insulation and the inside space of the dwelling from the much colder outside temperature for as long as the PCM continues to change from a liquid to a solid. This effectively reduces the load required on a heating system for the building.

After the PCM has become solidified, its temperature begins to drop and heat will transfer from the warmer inside space to the cooler outside space, and eventually the inside surface of the ceiling or wall structure may become cooler, requiring the furnace or other heat source to maintain the temperature inside the building at the desired level.

The cycling of the temperature above and below the phase changing temperature of the PCM in conjunction with the layers of insulative material therearound ensures that the inner layer of insulation material adjacent the wall or ceiling material will be shielded from the higher and lower outside temperatures experienced by the PCM, as the PCM changes from solid to liquid or vice versa. Several different methods can be utilized to apply the PCM to the intermediate layer when constructing the insulation system. For instance, the PCM can be applied in its liquid phase to an absorptive carrier sized and shaped so that the carrier can be encased in a bag for conveniently inserting between the first and second layers of insulative material. In another embodiment, the PCM in its liquid phase can be injected between a flat layer of impermeable material and a layer of expandable material so as to form a bubble or pocket having the PCM material therein. Similarly, liquid PCM can be injected into small compartments between two flexible sheets of material, such as Mylar®. In the above-described embodiments, the PCM intermediate layer can include air spaces which help the insulation system to become more effective, wherein the air spaces retard the movement of heat through the first or second insulative layers.

Yet another embodiment of the PCM intermediate layer comprises small globules of PCM material encapsulated into small individual beads by another material, such as oil, tar, epoxy, etc. The small beads can thereby be dispersed on top of the first insulative layer of material and be adhesively attached to the first and the second layer of insulative material.

PCM can also be used in a wall board, and wherein small pellets of PCM is applied to wall board as it is extruded or otherwise fabricated, such as styrofoam which functions to hold the PCM pellets in position in a wall structure. For example, the PCM can be applied to chopped cellulose, to the dimples in styrofoam material, or to other materials which carry the PCM pellets. Thus, the styrofoam material functions to surround and capture the phase change particles in a permanent structure for placement as an intermediate layer of a wall material in a wall structure, and when the phase change particles melt, the phase change liquid will be contained in its desired position within the styrofoam.

The PCM can be selected so that its phase change temperature is compatible with the desired results. For example, if the constant temperature space is to be maintained at about 75° F. and the range of temperatures of the variable temperature space is higher than and lower than the constant temperature space, the PCM most suitable for these conditions probably will have a phase change temperature close to 75° F. Therefore, the variable temperature space reaches temperatures higher than and lower than the temperature of the generally constant temperature space. However, if the range of the variable temperature space is higher than the temperature of the constant temperature space, the phase change temperature must be within the range of temperatures of the variable temperature space in order to function properly. This could place the phase change temperature substantially higher than the temperature of the constant temperature space.

Thus, it is an object of the present invention to provide an improved insulation system for placement between a constant temperature space and a variable temperature space, such as in the ceilings and wall structures of a dwelling or building structure.

Another object of the present invention is to provide a phase change insulation system for use in an attic space or in a wall structure between the indoor relatively constant temperature space and the outdoor environment which has a temperature range extending lower and higher than the phase change temperature, wherein an intermediate layer of PCM changes between a solid state and a liquid state at a phase changing temperature between the anticipated highest and lowest outside temperatures, so that the inside surface of the ceiling or wall structure is shielded from higher or lower temperatures as the PCM undergoes a change in phase.

Another object of the present invention is to provide processes for expediently producing an efficient large area insulation system including an intermediate layer of PCM.

Yet another object of the present invention is to provide an insulation system for a building structure including a layer of PCM that uses its latent heat of liquification and solidification to alternately absorb heat from and give up heat to the atmosphere as the temperature of the atmosphere rises above or drops below the phase changing temperature of the PCM.

Another object of the present invention is to provide an insulation system for use in a building structure which has improved thermal insulation properties and which is expedient and inexpensive to produce and to install.

A more complete understanding of the present invention will be had be those skilled in the art, as well as an appreciation of additional advantages, which will become apparent upon reading the detailed description of the preferred embodiment and examining the drawings, a brief description of which follows.

DETAILED DESCRIPTION OF THE PREFERRED EMBODIMENT

Figure 1:
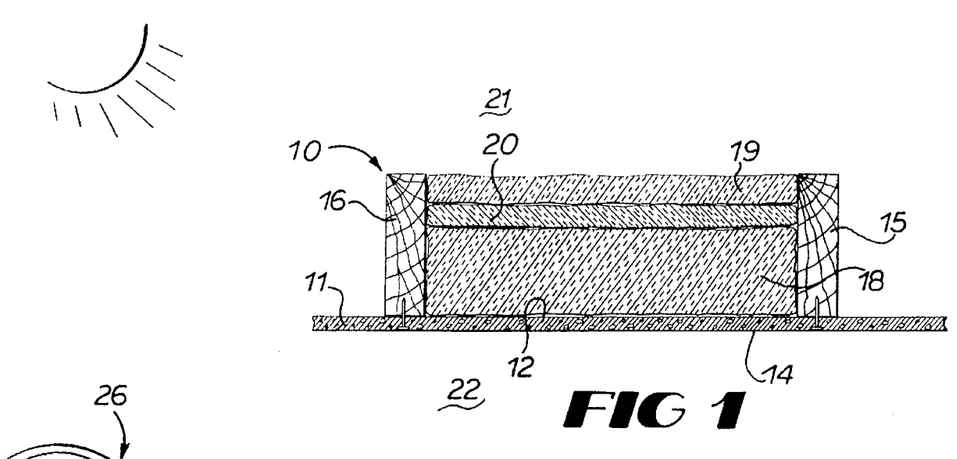
FIG. 1 is an end cross sectional view of adjacent ones of the attic joists in a ceiling structure of a typical house, illustrating the ceiling and the layers of insulation placed between adjacent joists.

Referring now in more detail to the drawings in which like numerals indicate like parts throughout the several views, FIG. 1 illustrates an insulation system 10 that can be used above the wall board 11 that forms the ceiling, with the wall board having an upper surface 12 facing an attic or an area with relatively large temperature variations, and a lower surface 14 facing generally the inside of a building, which experiences relatively small temperature variations. Such a system, as shown in FIG. 1, can also be used in a vertical external wall for insulation, which typically is exposed on one side thereof to relatively constant temperatures, and on the other side to variable temperatures which are higher than and lower than the constant temperature.

The insulation system 10 normally is positioned between a pair of joists 15 and 16 and adjacent the upper surface 12 of the Ceiling panel 11. In a preferred embodiment, the insulation system 10 comprises a first thicker layer of insulative material 18 seated on the upper surface 12 of the ceiling 11, a second thinner layer of insulative material 19 mounted parallel to and in an overlapping relationship with respect to the first layer 18, and an intermediate layer 20 of phase change material sandwiched between the facing surfaces of the first thicker layer of insulative material 18 and the second thinner layer of insulative material 19. The first thicker layer of insulation material 18 is usually placed adjacent the ceiling wall board 11 or an internal panel of a wall of a building, and the second thinner layer of insulation material 19 is placed facing exteriorly, such as facing an attic space 21 of the building. In addition, the layer of phase change material 20 can comprise any of the embodiments discussed hereinafter.

Preferably, the phase change material is selected from materials with characteristics that will change phase between the anticipated highest and lowest temperatures of the variable temperature space during a particular time lapse. As the PCM within the layers of insulation changes state, it maintains a substantially constant phase changing temperature although it absorbs heat from or gives up heat to the outside surface of a ceiling or the outside surface of a wall structure. Therefore, while the heat from a location outside of the wall or ceiling structure transfers through the second thinner layer of insulation and continues to be transmitted to the PCM layer during hot hours of the day, the layer of PCM will shield the first thicker layer of insulation and the panel of the ceiling or wall structure by the constant temperature conversion of sensible heat to latent heat in the PCM layer for as long as the PCM continues to change from a solid state to a liquid state. Then, when the PCM completely changes to a liquid state, the PCM will begin to increase in temperature and the heat will begin to be transferred across the first thicker layer of insulation 18 facing the upper surface 12 of the ceiling 11 which is adjacent the controlled temperature space 22.

The phase change material can be selected from a group consisting of: calcium chloride hexahydrate, sodium sulfate, paraffin, $Na_2SO_4 \cdot 10H_2O$, $CaCl_2 \cdot 6H_2O$, $NaHPO_4 \cdot 12H_2O$, $Na_2S_2O_3 \cdot 5H_2O$ and $NaCO_3 \cdot 10H_2O$. In addition, the thermal insulation layers can be selected from a group of insulation materials consisting of: fiberglass, mineral wool, urethane foam, cellulose, phenolic foam, polystyrene foam, styrofoam, isocyanate foam and sponge rubber, wherein in the embodiment disclosed herein the first thicker layer of material 18 is at least twice and up to four times the thickness of the second thinner layer of insulative material 19.

Figure 2:
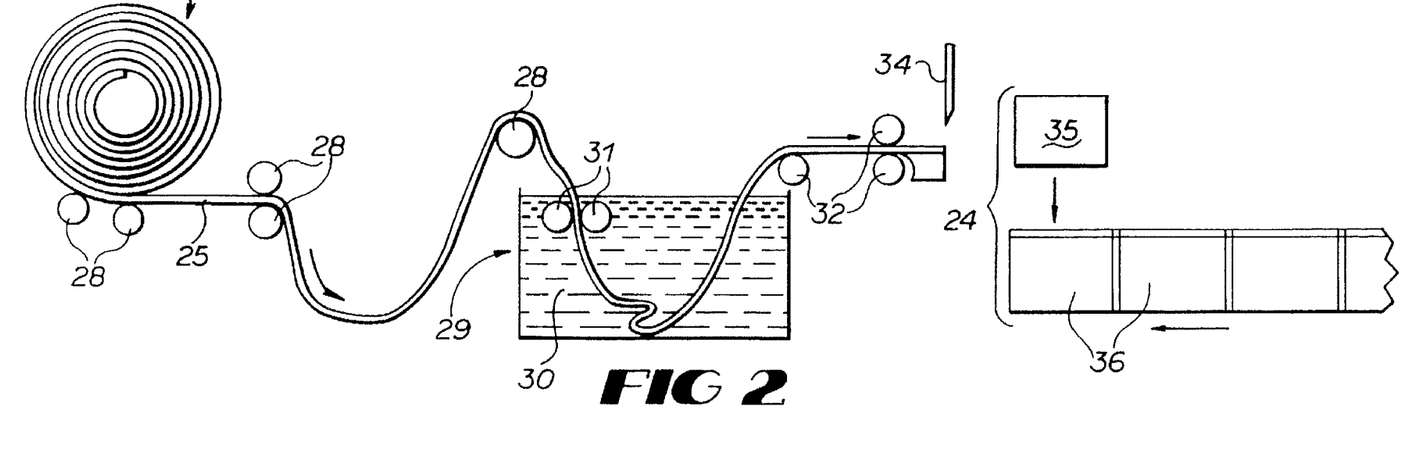
FIG. 2 is a side elevational view of a system for forming sacks containing an absorptive material soaked in PCM.

FIG. 2 illustrates a method of forming one embodiment 24 of the intermediate PCM layer 20, as shown in FIG. 1. This method comprises moving lengths of an absorptive material 25 from an absorptive material source 26 with rollers 28 toward a phase change material bath 29 having PCM 30 in its liquid state therein. The PCM 30 in the bath 29 is heated, such as by heating coils (not shown) to maintain the temperature of the liquid PCM above its phase changing temperature so that it is always in liquid state. When the absorptive material 25 is fed into the liquid PCM bath 29, the material absorbs the PCM and becomes at least partially saturated with the PCM, rollers 32 move the material along and position it so that a cutting device 34 can separate segments 35 of the material at predetermined lengths. Meanwhile, bags or pouches 36 move in an opposite direction as the direction of the absorptive material and are positioned so as to allow the cut segments 35 to be conveniently placed in the bags 36 and the bags are sealed about their segments 35 and used as the intermediate PCM layer of insulation.

Figure 3:
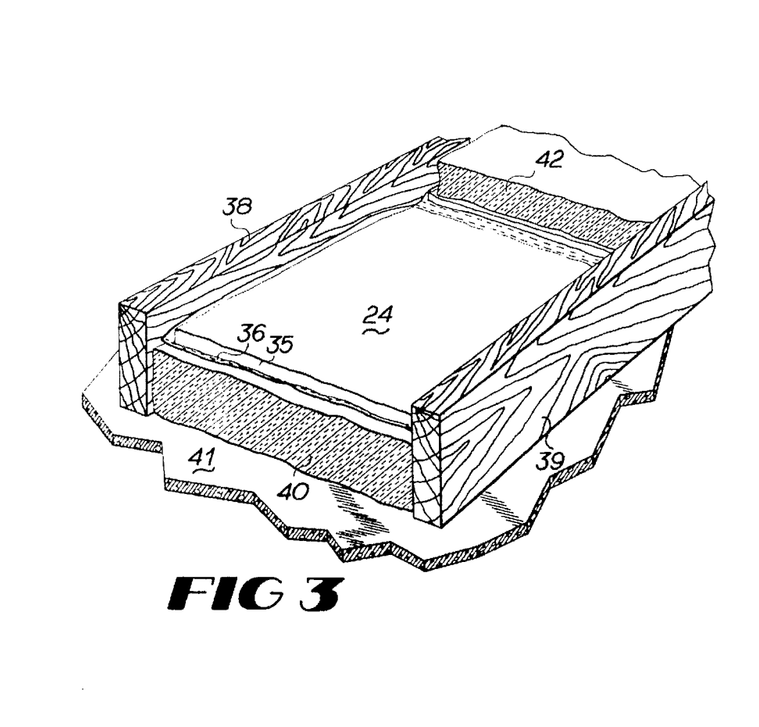
FIG. 3 is a detail perspective view of the product of FIG. 2 positioned in the insulation system of a ceiling, showing the layers of insulation partially removed.

FIG. 3 illustrates the embodiment 24 of the intermediate PCM layer formed by the process of FIG. 2. As seen in FIG. 3, the sheets of PCM absorptive material 35 is contained within the bags 36 so as to form the intermediate PCM layer 24, which is shaped and configured to the dimensions between a pair of joists 38 and 39. Similar to FIG. 1, the insulation system comprises a first thicker layer of insulative material 40, supported by a ceiling board 41, and a second thinner layer of insulative material 42. The PCM intermediate layer 24, therefore, is sandwiched therebetween. In addition, the absorptive material 35, which normally is at least partially saturated with liquid PCM, can consist of cellulosic materials, sponge materials, and other materials.

In a retrofit situation, the PCM layer can be placed directly on the old layer of insulation, across the exposed surfaces of the joists, with an upper layer of fiberglass, etc. placed over the PCM.

Figure 4:
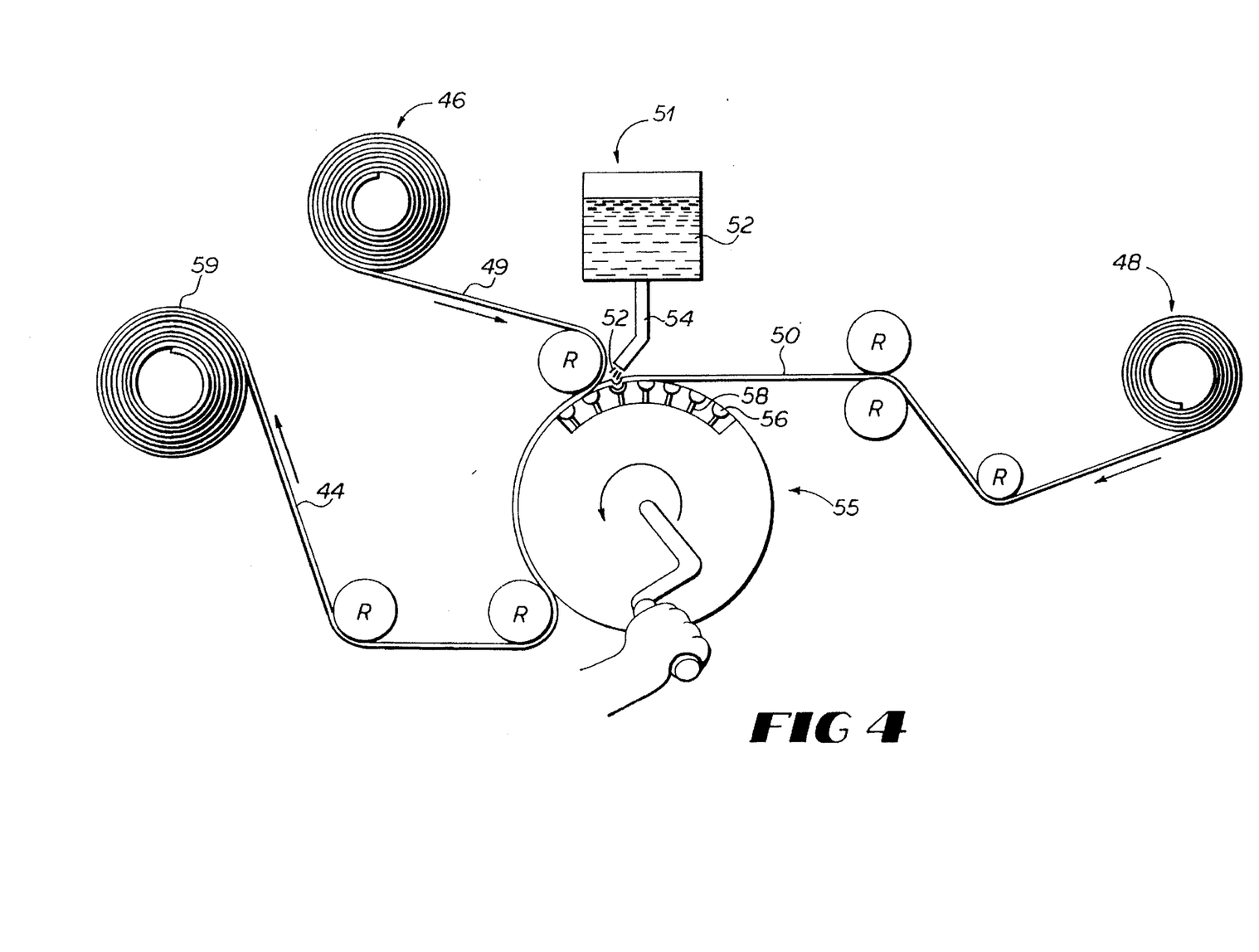
FIG. 4 is a side elevational view of a system for forming a sheet material having small pockets filled with liquid PCM.
Figures 5, 6:
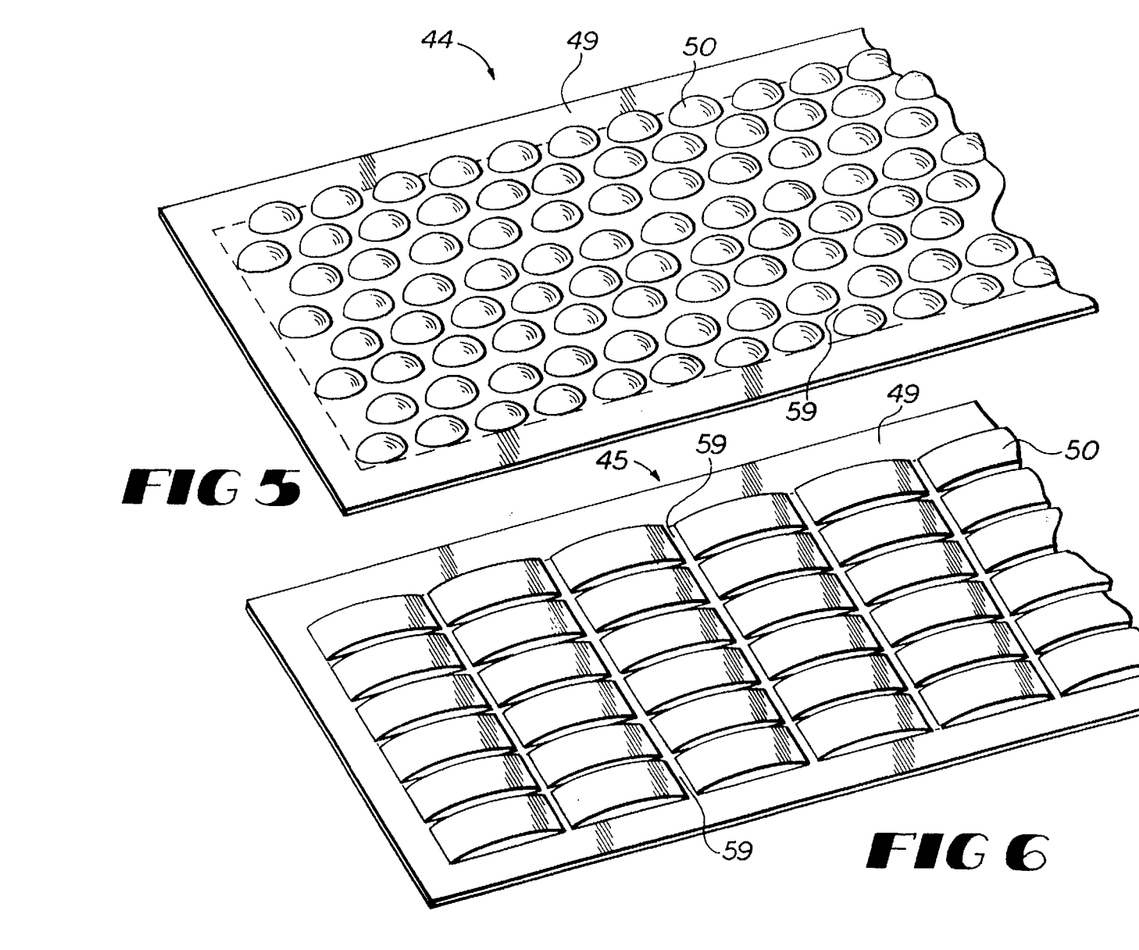
FIG. 5 is a perspective view of the finished product of FIG. 4.
FIG. 6 is a perspective view showing another embodiment of a PCM intermediate insulation layer showing a sheet of interconnected small bags filled with PCM.

FIG. 4 illustrates a method of forming other embodiments 44 and 45 (FIGS. 5 and 6) of the intermediate PCM layer of the insulation system. The method shown in FIG. 4 comprises two sheets of material 49 and 50 and the sheets of material are advanced along their lengths from a supply 46 and 48 respectively toward each other by means of rollers, which are generally designated by the letter "R." A heated tank 51 maintains liquid PCM 52 at a temperature above its phase changing temperature, wherein a predetermined quantity of liquid PCM 52 is dispensed through a nozzle 54 in a timed sequence. Both sheets of material 49 and 50 and the nozzle 54 all generally converge at one location adjacent a heated vacuum roller 55 having cavities 56 in the outer periphery of the roller 55. Therefore, as a vacuum in the roller 55 draws air from the cavity 56 through a neck portion 58 so that when the sheet material 50 lies directly over the cavity, the vacuum tends to draw the sheet material 50 into the cavity so as to form a depression in the sheet material for the liquid PCM 52 to be located when ejected by the tank nozzle 54. The heat of the vacuum roll 55 makes the sheet 50 pliable so that the vacuum can draw the sheet material into the pockets 56. Sheet material 49 then covers the depression having the liquid PCM ejected therein and forms a vacuum material for the "bubble pack" PCM intermediate layer. The sheet of material 49 is heat pressed onto the surfaces along the edge of the PCM filled cavity to seal the sheets 49 and 50 about each filled pocket of the sheet 50. Thus, the embodiments shown in FIGS. 5 and 6 can be formed in this manner, wherein the intermediate PCM filled material can be accumulated in a spiral reel for latter use as part of an insulation in the wall structure or can be applied in a continuing process through the inside layer and outside layer of the wall material. FIG. 5, for example, shows one of the embodiments formed by using the method of FIG. 4, and FIG. 6 shows another of the embodiments formed by the method of FIG. 4. However, the embodiment of FIG. 5 shows one sheet of the material 50 being flexible and the other overlying sheet 49 of materials to be generally inflexible, wherein FIG. 6 both sheets of material 49 and 50 are flexible material. The embodiments of FIGS. 5 and 6 are especially effective in reducing the transfer of heat through the wall or ceiling insulation system because when the PCM intermediate layer is positioned between the first thicker and second thinner layers of insulative material, and the gaps 59 (FIG. 8) between the PCM filled bubbles or pockets form air spaces in the intermediate layer of the insulation system. Therefore, the air spaces 59 are able to retard the movement of heat through the first or second insulative layers by having a capacity to store substantially weightless air in the air gaps 59 which aid the PCM to become a more efficient overall system.

Figures 7, 8, 9:
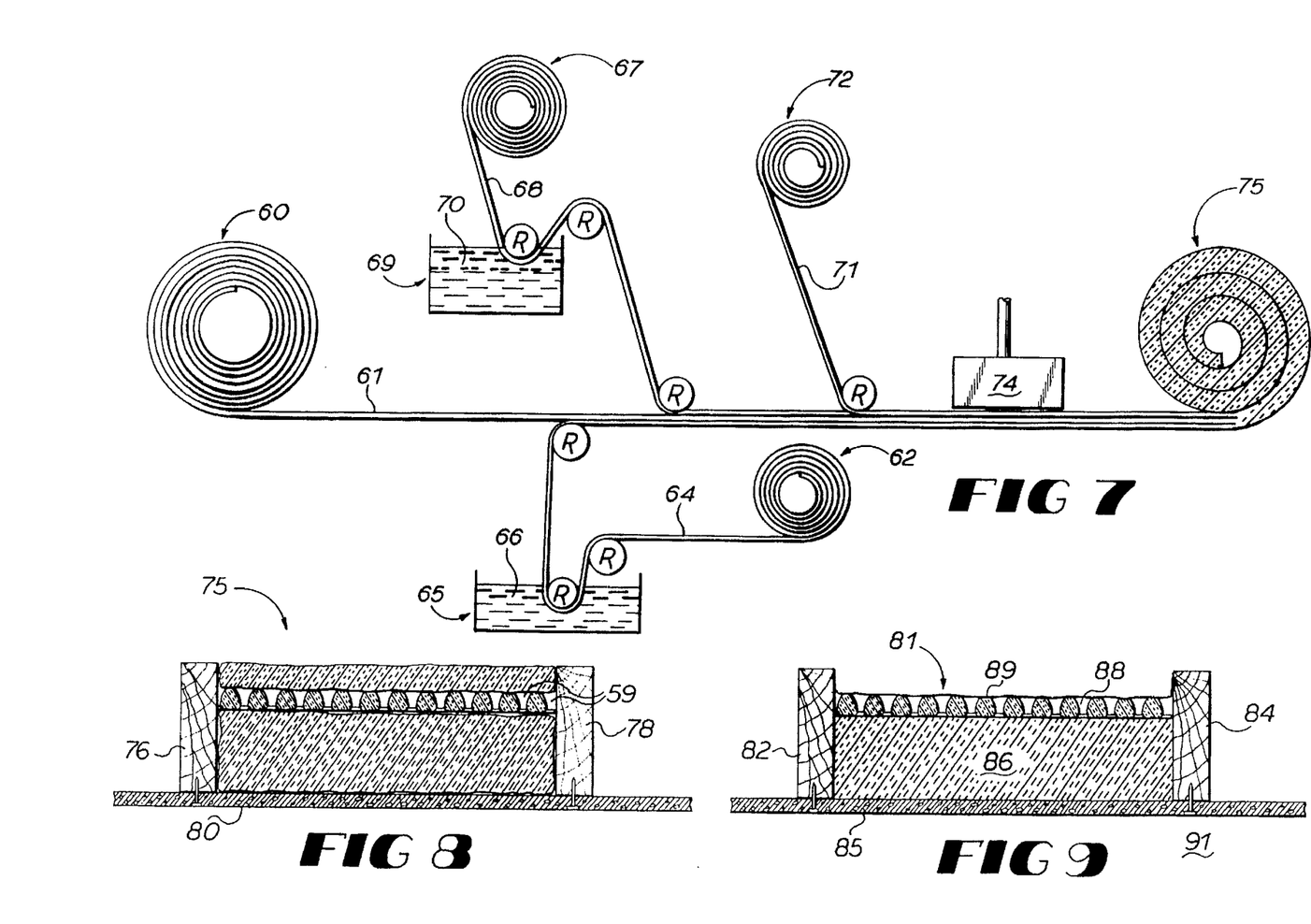
FIG. 7 is a side elevational view of a system for forming an insulation system using sheet insulation including a layer of PCM material.
FIG. 8 is an end cross sectional view of adjacent attic joists with the finished product of FIG. 7 shown in position in a ceiling environment.
FIG. 9 is an end cross sectional view similar to FIG. 8, and wherein the PCM layer of FIG. 7 is inverted and without the second overlapping layer of insulation material.

FIG. 7 illustrates a method of forming a prefabricated insulation system of the present invention having all of its components already connected so that the finished product can be directly installed in a ceiling or wall structure. A first reel 60 carrying a first thicker insulation material 61 is moved in one direction, wherein a second reel 62 carries a backing material 64 for supporting the insulation system when it is in its finished stage. The backing material 54 moves through a tank 65 having a liquid adhesive means 66 therein for coating the side of the backing material which is to meet and line the underside of the first thicker insulative material 61. A third reel 67 carrying sheets of PCM-filled material moves through a tank 69 filled with adhesive means 70 so as to coat both sides of the PCM intermediate layer 68, wherein its bottom side can be adhered to the first layer of insulative material 61 and its top layer can be adhered to a second layer of insulative material 71 which is dispensed by reel 72. The second layer of material 71 is usually thinner than the first layer 61 and is normally positioned adjacent an area with temperature fluctuations. A vacuum head 74 is supported at a position along the processing path after the second thinner layer of insulative material 71 has been applied onto the intermediate layer of PCM material 68 so as to clean off stray particles of insulative material, such as fiberglass particles. Finally, the finished product 75 is rolled onto a reel for subsequent use between a pair of joists 76 and 78 as shown in FIG. 8. FIG. 8, therefore, shows the finished product 75 of FIG. 7 in position above a ceiling wall board 80.

FIG. 9 shows yet another embodiment of the insulation system 81 positioned between joists 82 and 84, wherein the insulation system 81 rests on top of a ceiling board 85. The embodiment 81 comprises a thicker first layer 86 of insulative material, similar to the first layers of the other embodiments. An outer layer 88 comprises a thin reflective sheet 87 of material such as foil material for use in building structures which are typically exposed to high temperatures. The insulation system of this embodiment 81 illustrates a highly efficient system, wherein heat is initially reflected off of the outer surface of reflective material 87 and then when some heat penetrates the outer layer 88, the PCM-filled bubbles 89 use or "absorb" some of the heat in order to change phase, thereby reducing the heat that would otherwise transfer through the ceiling board 85 to a temperature-controlled area 91. In addition, the composition of the PCM material 90 can be adjusted for use in a high temperature environment such as by selecting a PCM material with a higher phase changing temperature or by mixing difference phase changing materials to form a material that will change phase faster.

Figure 10:
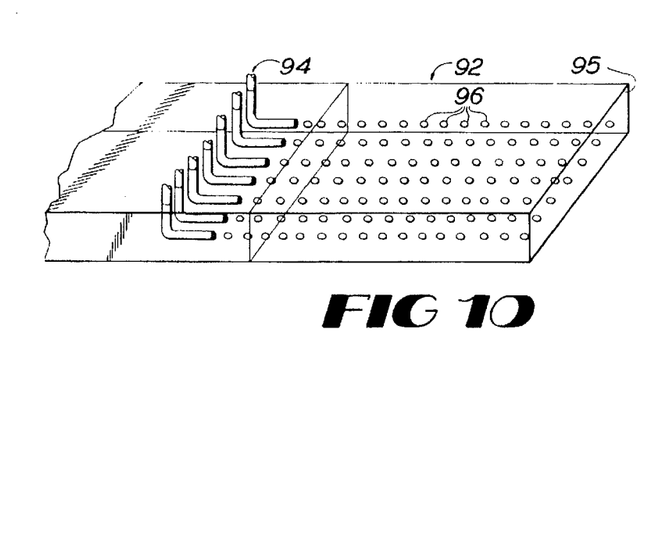
FIG. 10 is a side elevational view of a system for forming an insulation system having PCM pellets encapsulated by a sealant embedded therein.
Figure 11:
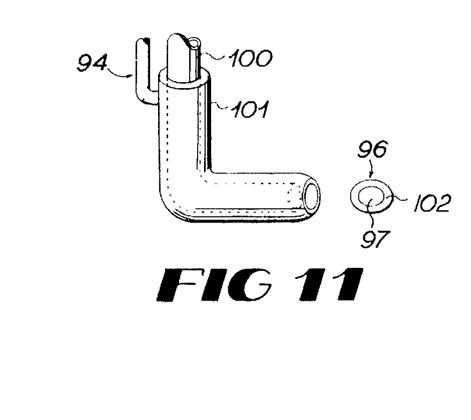
FIG. 11 is a detailed illustration of one of the nozzles of FIG. 10.
Figure 12:
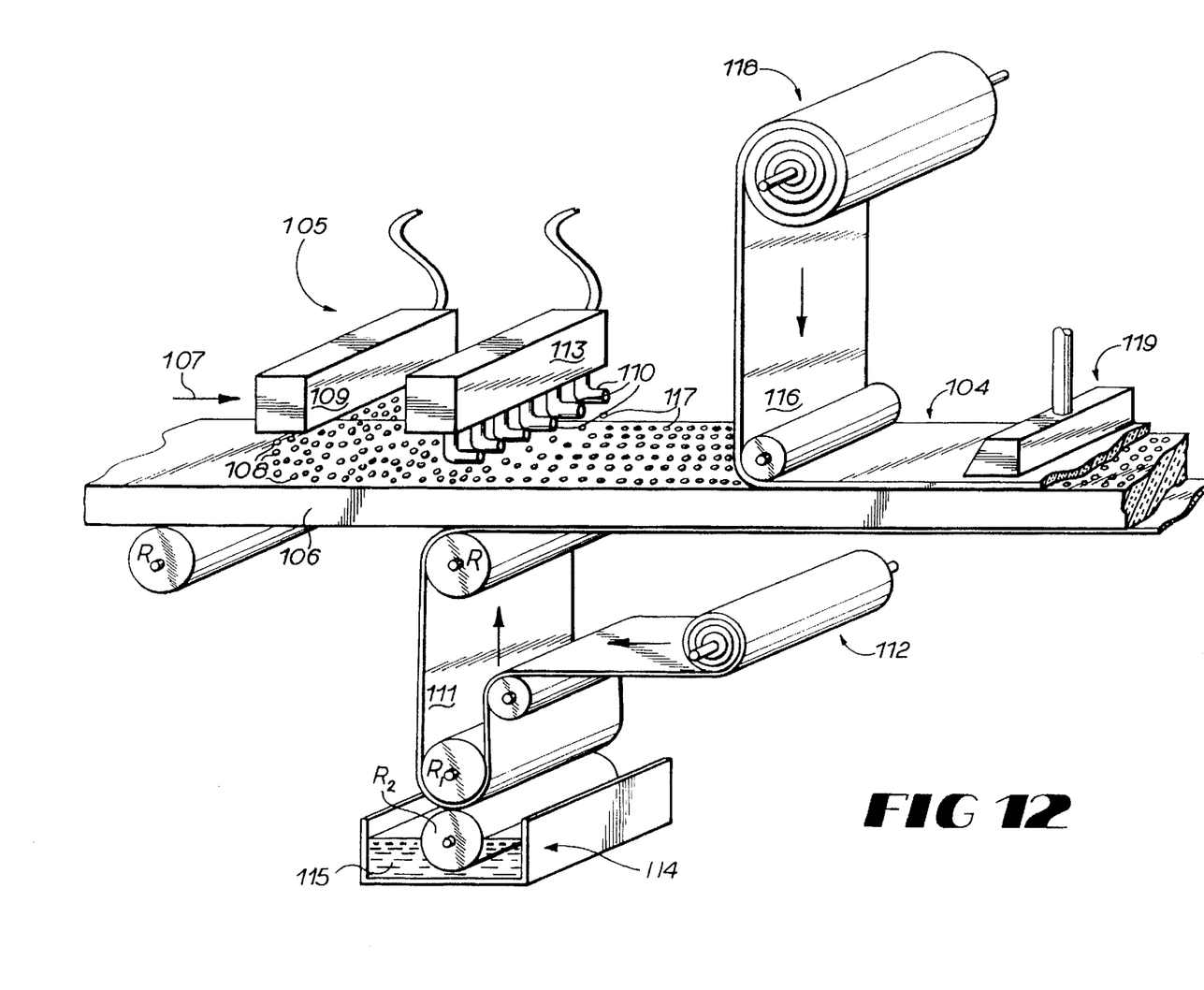
FIG. 12 is a perspective view of a system for forming another embodiment of the insulation of the present invention showing PCM beads dispersed as an intermediate layer.

FIGS. 10 and 11 illustrate a system 94 for forming another embodiment 92 of an insulation system, wherein the insulation system extrudes insulation foam board 95 having a plurality of pellets 96 filled with phase change material 97 dispersed therethrough. If the material of the foam board does not adequately encapsulate the PCM, an encapsulation material can be used. The system 94 comprises a pair of concentric nozzles 100 and 101, wherein one nozzle encircles the other, as most clearly seen in FIG. 11. The inner nozzle with the smaller diameter 100 releases a supply of PCM beads 97, while the outer nozzle with the larger diameter 101 releases a supply of encapsulating material 102, which is synchronized to be pulsed out and around the PCM bead 97 immediately before being exposed to an exterior surface of the wall board 95. The encapsulating material 102 can comprise a sealing material, such as oil, tar, or epoxy which fully encapsulates the PCM bead 97. With the embodiment 92 of the insulating system positioned in a wall structure of a building, the PCM 97 would behave in the same manner as the above-described embodiments, by retarding the transferred heat between an area of relatively constant temperature and an area having variable temperatures. In addition, this embodiment disperses the PCM-filled pellets 96 uniformly through the wall board by dispensing the pellets 96 continually by moving the wall board in one direction. Such an embodiment aids the overall efficiency of the insulation system. FIG. 12 illustrates a system 105 for forming another embodiment 104 of an insulation system, wherein a first thicker layer of insulative material such as a fiberglass blanket 106 is moved by roller means, generally designated R in the direction of arrow 107. Liquid adhesive droplets 108 are evenly dispersed by an adhesive distributor 109 directly onto the first thicker layer of insulative material 106. At a next station, solid pellets 117 of phase-changed filled material are dispersed through a plurality of nozzles 110, extending from a pellet source 113 which spans the width of the first layer of insulative material 106. Simultaneously a backing material 111 is moved by roller means R from a backing material source 112 through a tank 114 filled with liquid adhesive means 115. As seen in FIG. 12, a lower roller means $R_2$ is partially immersed in the adhesive material 115 so as to transfer the liquid adhesive means 115 to the roller $R_2$. The roller $R_1$ moves the backing material 111 towards the roller $R_2$, wherein a doctor blade (not shown) squeezes the roller $R_2$ so as to remove the excess liquid adhesive from the roller $R_2$. When the two rollers $R_1$ and $R_2$ meet, the adhesive 115 from roller $R_2$ is transferred onto the backing sheet on roller $R_1$. After the adhesive means 115 has been applied to the backing material 111, the backing material 111, when joined with the first thicker layer of insulative material 106, will adhere thereto. Similarly, when the PCM-filled pellets 117 are distributed on the sheet 106 with the adhesive droplets 108, the PCM-filled pellets become adhered to the first thicker insulative material 106. Finally, a second thinner layer of insulative material such as a fiberglass blanket 116 moves from its source 118 over the PCM-filled pellets 117 and the adhesive droplets 108, wherein the adhesive droplets 108 bond the second thinner insulative layer of material 116 to the first layer of thicker insulative material 106. A vacuum head 119 also can be positioned over the final product so as to induce a stream of air about the product and clean the surface of the second thinner layer of insulative material 116 of any particles so that the final product can be cut into segments and packed for immediate use in a building structure.

Figure 13:
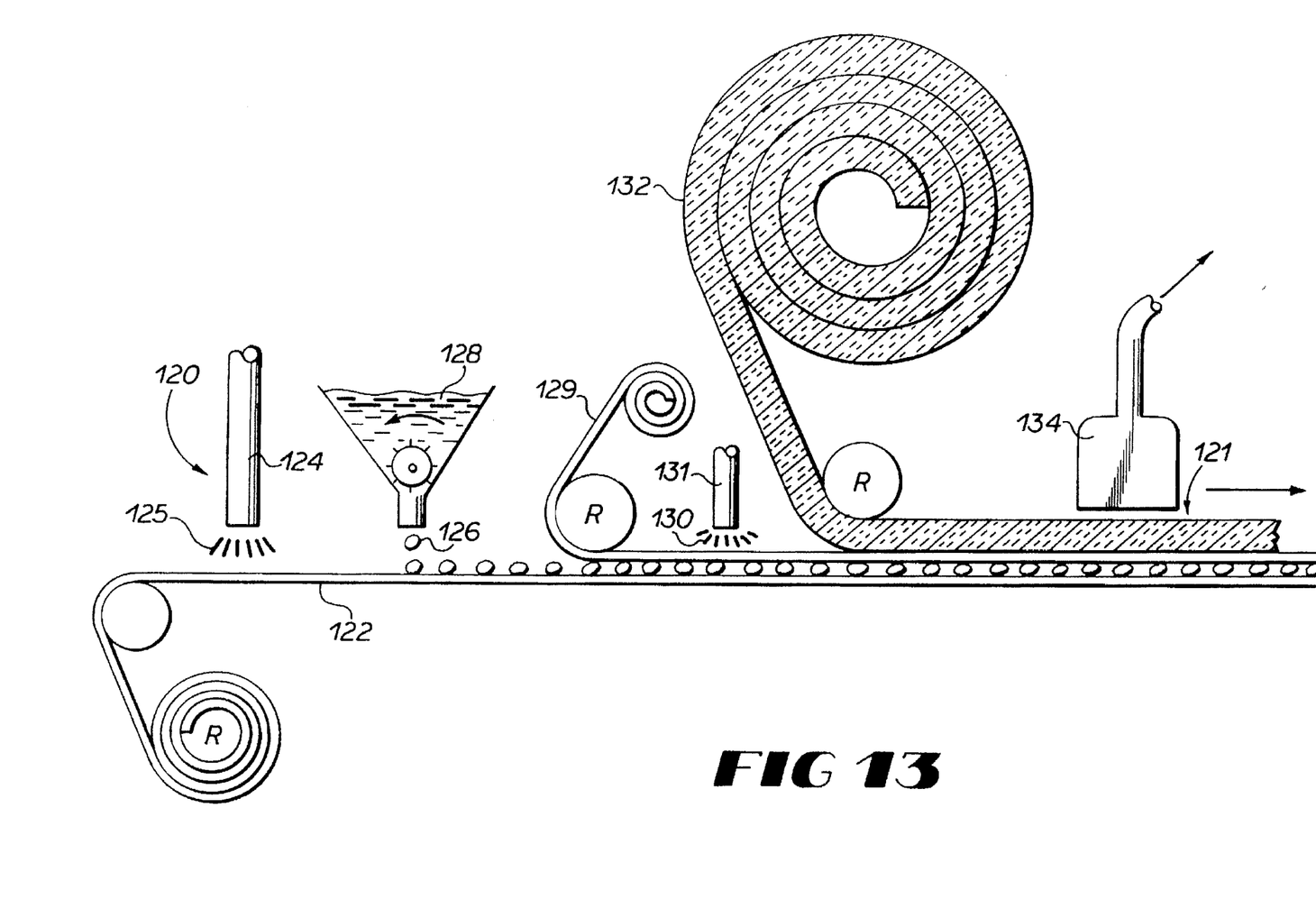
FIG. 13 is a side elevational view of yet another system for forming an insulation system.

FIG. 13 illustrates yet another system 120 of forming another embodiment 121 of the insulation system of the present invention, wherein a single sheet of backing material 122 such as aluminum foil is moved by means of a roller toward an adhesive spray station 124 which sprays liquid adhesive means 125 on the vacuum material 122. At the next station, PCM-filled beads 126 are then distributed from its source 128 over the foil backing sheet 122 and the liquid adhesive spray 125 positioned thereon, so that the PCM-filled beads 126 are bonded to the backing sheet 122. Another sheet of flexible material 129 is positioned over the PCM-filled beads 126 and overlies the backing sheet of material 122. Second liquid adhesive 130 is then dispensed from its source 131 over the flexible sheet of material 129. Finally, a layer of insulative material such as a fiberglass blanket 132 is moved over and bonded to the flexible sheet of material 129 by the liquid adhesive 130. Similar to the system shown in FIG. 12, a vacuum head 134 is positioned over the final product so as to induce a stream of air about the upper layer of material and to remove any loose insulative particles of fiberglass, which might be harmful to a work person. The work product then can be cut and packed in segments so that the composite insulation blanket is already assembled and ready to be placed directly in a ceiling or wall structure.

Figure 14:
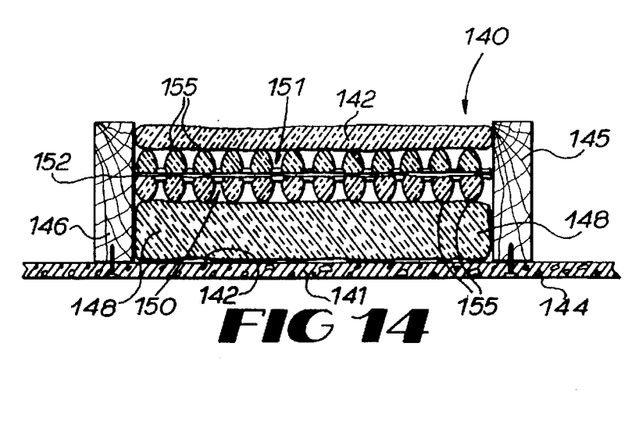
FIG. 14 is a side elevational view of yet another system for forming an insulation system.

FIG. 14 illustrates another embodiment 140 of the insulation system of the present invention, shown above a wall board 141 which forms the ceiling. The wall board 141 has an upper surface 142 facing an attic or an area with relatively larger temperature fluctuations, and a lower surface 144 facing the inside of a building, which normally is maintained at a generally constant temperature. The insulation system 140 is placed between a pair of joists 145 and 146 and adjacent the upper surface 142 of the ceiling panel 141. A first thicker layer of insulative material 148 is seated on the upper surface 142 of the ceiling 141, and a second thinner layer of insulative material 142 is mounted parallel to and in an overlapping relationship with respect to the first layer 148. In addition, two layers of material 150 and 151 having PCM therein are sandwiched between the first layer 148 and the second layer 149 of insulative material. As seen in FIG. 14, the two layers of PCM material 150 and 151 are similar to the PCM material shown in FIG. 5, wherein backing material 152 and 154 supports a plurality of PCM-filled bubbles 155.

The embodiment 140 shown in FIG. 14 provides yet another layer of PCM material in the intermediate layer of the insulation system for higher insulative capacity. With the PCM bubbles facing each side of the insulation material 148 and 149, heat transferring through either layer of insulation must first be absorbed by one layer of the PCM material, then the excess heat can be absorbed by the other layer of PCM material. Obviously, any of the embodiments of the PCM material can be layered to create this dual-barrier effect. Moreover, the intermediate layer can comprise even three or four layers of insulative material.

In all the above-described embodiments, the type or quantity of PCM used can be selected to accommodate a specific environment. For example, different types of PCM material can be mixed together or different layers of PCM material can be used to control the transfer of heat through the structure. However, it is necessary that each phase change material undergo a change of state in order that the phase change material absorbs or gives up heat to shield the inner layer of insulative material and subsequently the ceiling or wall adjacent the temperature controlled space.

While the invention has been disclosed in the form and shape of an insulation system for a ceiling or wall structure, it should be apparent to those skilled in the art that similar structures can be utilized for walls and ceilings for mobile homes and industrial buildings, and for use in internal wall structures where one space has a continuing shift in temperatures and the other space is maintained in a substantially constant temperature.

It will be understood that the foregoing relates only to preferred embodiments of the present invention, and that numerous changes and modifications may be made therein without departing from the spirit and scope of the invention as set forth in the following claims.

I claim:

1. A thermally insulated wall structure of a building placed in heat exchange relationship between a first space maintained at a generally constant predetermined temperature and a second space of a variable temperature within a range of temperatures extending higher than and lower than the temperature of the constant temperature space during the course of a twenty-four hour day, comprising:

a first layer of heat insulation material having an insulation value and positioned adjacent the constant temperature space, a second layer of heat insulation material overlying said first layer of heat insulation material and positioned adjacent the variable temperature space, an intermediate layer of phase change material dispersed between said first and second layers of heat insulation materials comprising a phase change material that changes between a solid state and a liquid state at a predetermined phase change temperature, said phase change temperature falling within said range of temperatures of the variable temperature space during the course of a twenty-four hour day, said intermediate layer of phase change material contained in a plurality of pockets formed by bonding two sheets of material together for maintaining the phase change material in fixed dispersed positions between said first and second layers of heat insulation material during both phases of the phase change material, said phase change material between the layers of heat insulation material being arranged to absorb heat from the variable temperature space in response to the temperature of the variable temperature space becoming higher than the phase change temperature, or to give up heat to the variable temperature space in response to the temperature of the variable temperature space becoming lower than the phase change temperature, and the insulation value of said second layer of insulation material being lower than the insulation value of said first layer of insulation so that said phase change material more readily absorbs heat from or gives up heat to the variable temperature space than to the constant temperature space.

2. The thermally insulated wall structure of claim 1 and wherein said first and second layers of material are selected from a group of insulation materials consisting of: fiberglass, mineral wool, urethane foams, phenolic foam, expanded polystyrene foam, styrofoam, isocyanate foam, sponge rubber, vermiculite, perlite, ceramic, and cellulose.

3. The thermally insulated wall structure of claim 1 and wherein said phase change material is selected from a group consisting essentially of: calcium chloride hexahydrate, sodium sulfate, paraffin, $Na_2SO_4 10H_2O$, $CaCl_2.6H_2O$, $NaHPO_4.12H_2O$, $Na_2S_2O_3.5H_2O$ and $NaCO_3.10H_2O$.

4. The thermally insulated wall structure of claim 1 and wherein said phase change material is selected from a group of phase change materials whose phase changing temperature is greater than the generally constant predetermined temperature of the constant temperature space.

5. The thermally insulated wall structure of claim 1 and when the average temperature of the variable temperature space is typically higher than the generally constant predetermined temperature of the constant temperature space, and the phase change material is selected so that its phase changing temperature is greater than the generally constant predetermined temperature.

6. The thermally insulated wall structure of claim 1 and when the average temperature of the variable temperature space is typically lower than the generally constant predetermined temperature of the constant temperature space, and the phase change material is selected so that its phase changing temperature is lower than the generally constant predetermined temperature.

7. The thermal insulation system of claim 1 and wherein said intermediate layer of phase change material comprises a plurality of bags each having a pouch therein containing the phase change material.

8. The thermally insulated wall structure of claim 1 and wherein said two sheets of material both comprise flexible sheets of material so that when the liquid phase change material is placed in the pockets, the two sheets of material protrude where the phase change material-filled pockets are formed.

9. The thermally insulated wall structure of claim 1 and wherein said plurality of pockets which are filled with phase change material form air gaps between said first and second layers of heat insulation materials so as to retard heat from transferring through said wall structure.

10. The thermally insulated wall structure of claim 1 and wherein said intermediate layer of phase change material comprises a plurality of pellets of phase change material encapsulated by another material, whereby the phase change material is constantly contained by the encapsulating material.

11. The thermally insulated wall structure of claim 1 and further including at least a second intermediate layer of phase change material dispersed adjacent said intermediate layer of phase change material for providing multiple intermediate heat transfer barriers for retarding heat transfer through said wall structure.

12. A thermally insulated wall structure in a building structure between a first zone maintained at a predetermined range of temperatures and an adjacent zone of variable temperature which vary to temperatures higher than and lower than the temperatures of said first zone, said wall structure comprising:

a laminated sheet of heat insulation material including a first sheet of insulation material facing the zone of predetermined range of temperatures, a second sheet of insulation material overlying said first sheet and facing the adjacent zone of variable temperature, said second sheet of insulation material having a heat insulation value lower than the heat insulation value of said first sheet of insulation material, an array of pockets formed between said sheets of insulation material and extending substantially uniformly between said first and second sheets of insulation material, and phase change material confined in said pockets having a phase change temperature within the range of temperatures of the variable temperature space.

13. The thermally insulated wall structure of claim 12 and wherein said phase change material is selected from the group consisting essentially of: calcium chloride hexahydrate, sodium sulfate, paraffin, $Na_2SO_4.10H_2O$, $CaCl_2.6H_2O$, $NaHPO_4.12H_2O$, $Na_2S_2O_3.5H_2O$ and $NaCO_3.10H_2O$.

14. The thermally insulated wall structure of claim 12 and wherein at least one of said first and second sheets are heat fusible and is heat fused to the other sheet.

15. A thermally insulated attic of a building structure having a ceiling structure for a dwelling space below said attic, including a first layer of insulation in contact with the ceiling structure and a second layer of insulation overlying said first layer of insulation, and an intermediate layer of phase change material contained in a plurality of pockets formed by bonding two sheets of material together and positioned between said first and second layers of insulation material, said phase change material having a phase change temperature between a high temperature and a low temperature of the attic during the course of a twenty-four hour day, the insulation value of said second layer of insulation material being lower than the insulation value of said first layer of insulation so that said phase change material more readily absorbs heat from or gives up heat to the attic than to said ceiling structure.

16. The thermally insulated attic of claim 15 and wherein said intermediate layer of phase change material is in the form of beads spaced from one another.

17. The thermally insulated attic of claim 15 and wherein said intermediate layer of phase change material comprises sheet material having beads of phase change material dispersed from one another in said sheet material.

18. The thermally insulated attic of claim 15 and wherein said intermediate layer of phase change material includes means for supporting discrete beads of phase change material in a dispersed array.

19. In a building structure having an interior space maintained in a predetermined temperature range and an adjacent variable temperature space exposed to the atmosphere outside the building structure which has high and low temperatures during the course of a twenty-four hour day which are higher than and lower than the predetermined temperature range, the improvement therein of a wall structure positioned in heat exchange relationship between said interior space and said variable temperature space, said wall structure including first and second layers of heat insulation material and an intermediate layer of phase change material positioned between said first and second layers, said phase change material contained in a plurality of pockets formed by bonding two sheets of material together for maintaining the intermediate layer phase change material uniformly dispersed between said first and second layers of heat insulation material, said phase change material having a phase change temperature between the high and low temperatures of the variable temperature space during the course of a twenty-four hour day, said first layer of heat insulation material facing said interior space and said second layer of heat insulation material facing said variable temperature space, and said second layer of heat insulation material having a heat insulation value which is lower than the heat insulation value of said first layer of heat insulation material so that said phase change material more readily absorbs heat from or gives up heat to said variable temperature space.

20. An insulated building structure having a constant temperature space and a variable temperature space adjacent said constant temperature space reaching high and low temperatures during the course of a twenty-four hour day, said building structure including:

a wall structure positioned between said spaces and including a layer of phase change material placed in heat exchange relationship between said constant temperature space and said variable temperature space, an array of pockets supporting the phase change material substantially uniformly about said layer, said phase change material having a phase change temperature located between the high and low temperatures of the variable temperature space during the course of a twenty-four hour day, heat insulation material juxtaposed both sides of said phase change material, with the heat insulation material between said phase change material and said constant temperature space having an insulation value higher than the insulation value of the heat insulation material between said phase change material and said variable temperature space, so that during the course of a twenty-four hour day said phase change material more readily absorbs heat from or gives up heat to said variable temperature space and the phase change material tends to change between a solid state and a liquid state in response to the temperature of the variable temperature space exceeding or dropping below the phase change temperature.

21. The invention of claim 20 and wherein said means for supporting phase change material substantially uniformly about the sheet comprises an absorbent material supporting the phase change material.

22. The invention of claim 20 and further including spaced parallel ceiling joists, a ceiling panel supported by said ceiling joists, and said layer of phase change material placed between said ceiling joists in overlying relationship with respect to said ceiling panel and supported by said ceiling panel and of a width sufficient to span the entire space between the ceiling joists.

23. The invention of claim 20 and further including spaced parallel support beams, a structural panel supported by said support beams, and said layer of phase change material placed between said support beams in overlying relationship with said structural panel and of a width to substantially span the entire space between said support beams.

24. In a thermally insulated building structure having an external wall structure defining a space inside the building structure maintained in a predetermined range of temperatures, and the space external to the building structure being open to the atmosphere and subjected to changing temperatures of the atmosphere, with the external wall structure in heat exchange relationship between the space inside the building structure and the variable temperature space external to the building structure, the improvement therein comprising:

phase change material contained internally within the external wall structure of said building, support means defining pockets therein for supporting the phase change material uniformly distributed in an array throughout the length and width of the external wall structure, layers of heat insulation material positioned in said external wall structure on opposite sides of and in overlying relationship with respect to said layer of heat insulation material, with the heat insulation material between the phase change material and the constant temperature space having a higher insulation value than the heat insulation material between the phase change material and the variable temperature space, said phase change material having a phase change temperature between the high temperature and the low temperature of the space external to the building in the course of a twenty-four hour day so that in the course of a twenty-four hour day the phase change material tends to change between solid state and liquid state inside the external wall structure of the building in response to the temperature of the atmosphere exceeding or dropping below the phase change temperature.

25. The thermally insulated building structure of claim 24 and wherein said external wall structure comprises a ceiling structure.

26. The thermally insulated building structure of claim 25 and wherein said external wall structure comprises an external vertical wall of the building structure.

* * * * *